(12) United States Patent
Boulard et al.

(10) Patent No.: US 7,264,297 B2
(45) Date of Patent: Sep. 4, 2007

(54) TONNEAU COVER HINGE

(75) Inventors: Robert Boulard, Massillon, OH (US); Aden L. Miller, Apple Creek, OH (US)

(73) Assignee: A.R.E. Accessories, LLC, Massillon, OH (US)

( * ) Notice: Subject to any disclaimer, the term of this patent is extended or adjusted under 35 U.S.C. 154(b) by 142 days.

(21) Appl. No.: 11/199,336

(22) Filed: Aug. 8, 2005

(65) Prior Publication Data
US 2006/0033355 A1 Feb. 16, 2006

Related U.S. Application Data

(60) Provisional application No. 60/601,276, filed on Aug. 13, 2004.

(51) Int. Cl.
*B60P 7/02* (2006.01)
(52) U.S. Cl. .................................................. 296/100.1
(58) Field of Classification Search ........... 296/100.01, 296/100.02, 100.06, 100.08, 100.1
See application file for complete search history.

(56) References Cited

U.S. PATENT DOCUMENTS 2,989,340 A * 6/1961 Penner .................... 296/100.1
5,971,446 A * 10/1999 Lunney, II ............. 296/100.08
5,988,728 A * 11/1999 Lund et al. ............. 296/100.03
6,042,173 A * 3/2000 Nett ....................... 296/100.06
6,186,576 B1 * 2/2001 Kepley et al. ........... 296/100.1
6,309,005 B1 * 10/2001 Priest et al. ........... 296/100.06
6,447,045 B1 * 9/2002 Dickson et al. ........ 296/100.08
2004/0084928 A1 * 5/2004 Bacon .................... 296/100.06
2006/0033355 A1 * 2/2006 Boulard et al. .......... 296/100.1
2006/0175863 A1 * 8/2006 Evans .................... 296/100.08

* cited by examiner

*Primary Examiner*—H Gutman
(74) *Attorney, Agent, or Firm*—Brouse McDowell; Daniel A. Thomson

(57) ABSTRACT

A hinge system is used to adjust a cover member between a closed position where the cover member covers at least a portion of a vehicle bed and an open position where the cover member does not cover the vehicle bed. The hinge system may include first and second arms that are pivotally attached and a biasing device operatively connected to the first and second arms that biases the cover member toward the open position whenever the cover member is not in the closed position and that does not bias the cover member toward the open position whenever the cover member is in the closed position.

18 Claims, 10 Drawing Sheets

TONNEAU COVER HINGE

RELATED APPLICATIONS

This application claims the benefit of provisional application Ser. No. 60/601,276 field on Aug. 13, 2004.

I. BACKGROUND OF THE INVENTION

A. Field of the Invention

The invention relates to methods and apparatuses concerning hinges used for vehicle covers, and more particularly to methods and apparatuses concerning a hinge system for a tonneau cover and the like.

B. Description of the Related Art

Cover members for use in covering the beds or boxes of pick-up trucks and other vehicles are well known in the art. One type of such cover members is known as a tonneau cover. Tonneau covers generally are formed of a rigid (non-flexible) material such as fiberglass, for example, and are mounted to the vehicle bed with one or more hinges. The hinges permit the tonneau cover to be placed in an open position, where access to the vehicle bed is permitted, and a closed position, where the tonneau cover covers the vehicle bed and thus access to the vehicle bed is not permitted.

Several types of hinges are known to be used with tonneau covers including, continuous "piano style" hinges, living hinges, compound hinges and scissor hinges. While many of the known hinge systems work well for their intended purpose, there are problems common to all including: sealing problems between the tonneau cover and the surface of the vehicle upon which the tonneau cover rests; alignment problems between the tonneau cover and the vehicle; and, the relatively large force necessary to raise the tonneau cover into the open position.

This invention greatly minimizes these problems by providing a hinge system for tonneau covers and the like, where the force required to open the tonneau cover is minimized, a proper seal between the toneau cover and the vehicle is maintained, and stability and alignment of the tonneau cover is maximized.

II. SUMMARY OF THE INVENTION

According to one aspect of this invention, a hinge system is used in adjusting a cover member between a closed position where the cover member covers at least a portion of a vehicle bed and an open position where the cover member does not cover the vehicle bed. The hinge system may include: (a) a first arm having first and second ends and a mid-section where the first end is adapted to be connected to the vehicle and the second end is adapted to be connected to the cover member; (b) a second arm having first and second ends and a mid-section where the first end is adapted to be connected to the vehicle and the second end is adapted to be connected to the cover member, the mid-section of the first arm may be pivotably connected to the mid-section of the second arm; and, (c) a biasing device that is operatively connected to the first and second arms that biases the cover member toward the open position whenever the cover member is not in the closed position and that does not bias the cover member toward the open position whenever the cover member is in the closed position.

According to another aspect of this invention, the mid-section of the first arm, the mid-section of the second arm and the biasing device are substantially parallel when the cover member is in the closed position.

According to still another aspect of this invention, a hinge system may include: (a) a first arm that has first and second ends and a mid-section where the first end is adapted to be connected to a vehicle; (b) a second arm having first and second ends and a mid-section where the first end is adapted to be connected to the vehicle and the mid-section is pivotably connected to the mid-section of the first arm; and, (c) a mounting rail that is adapted to be connected to a cover member and having a channel that slidingly receives one of the second ends of the first and second arms and that pivotably receives the other of the second ends of the first and second arms.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, one or more embodiments of which will be described in detail in this specification and illustrated in the accompanying drawings which form a part hereof and wherein.

IV. DESCRIPTION OF THE INVENTION

Figure 1:
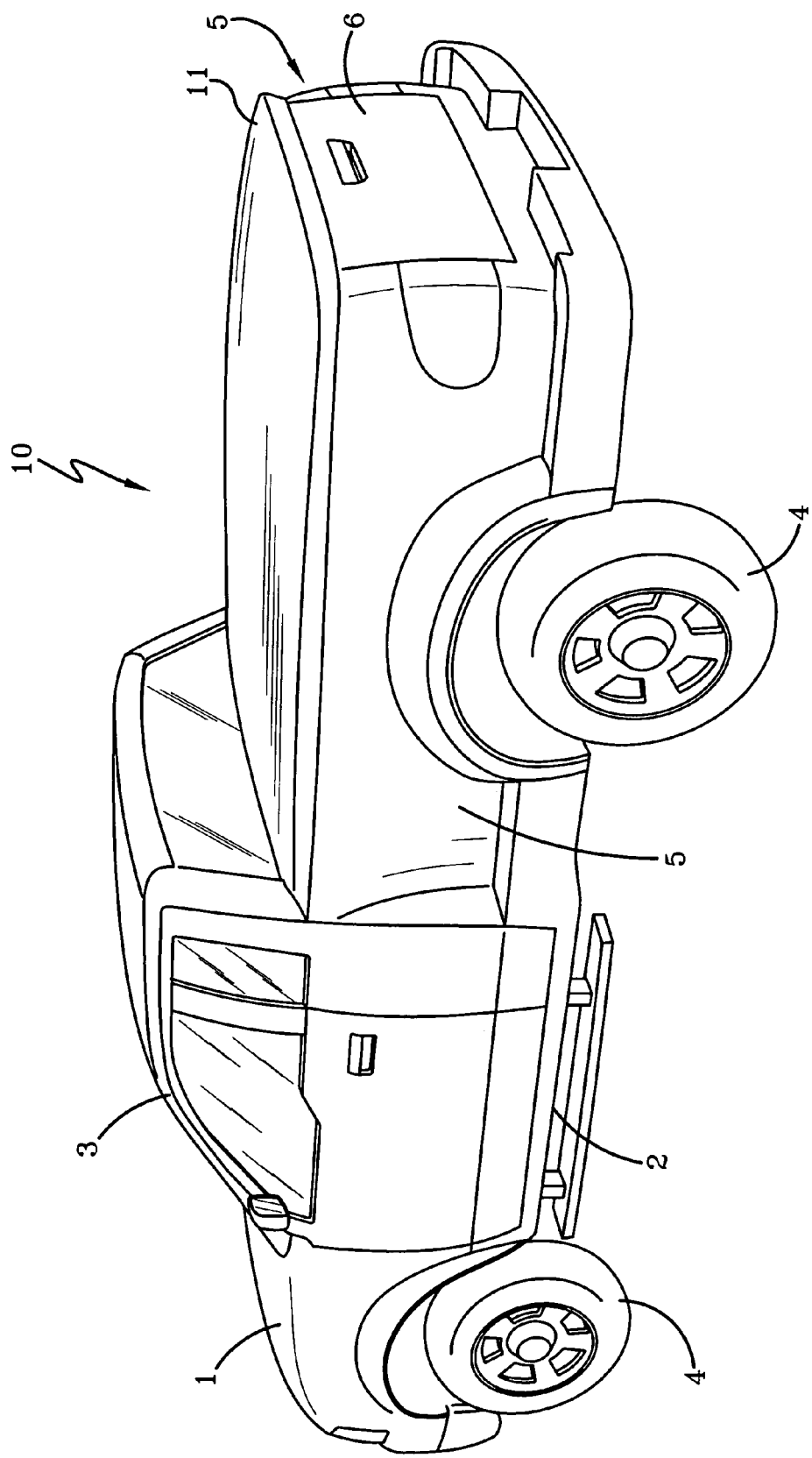
FIG. 1 is a perspective view of a vehicle equipped with the hinge system of this invention showing the cover member in a closed position.
Figure 2:
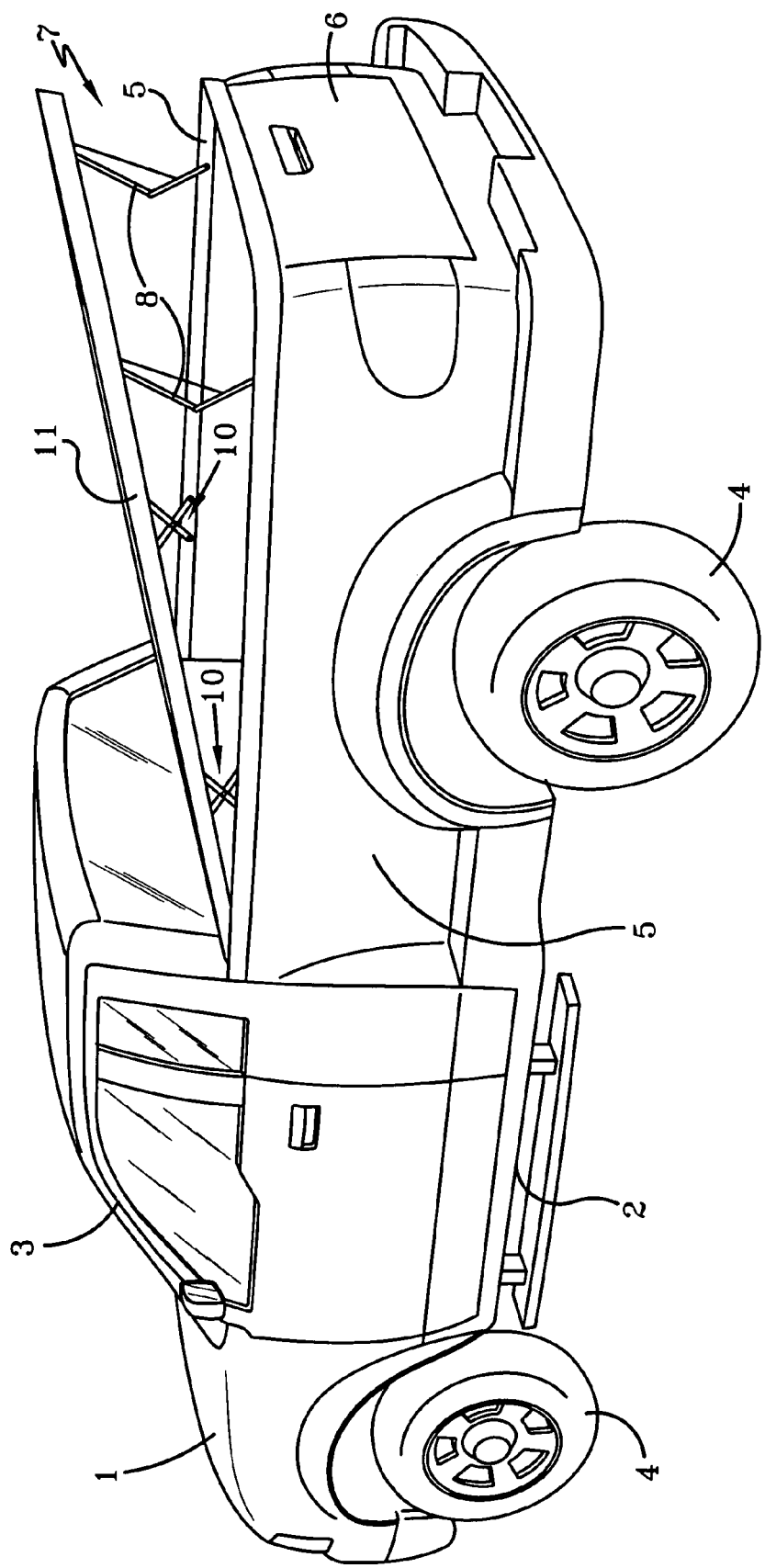
FIG. 2 is a perspective view of a vehicle equipped with the hinge system of this invention showing the cover member in an open position.
Figure 3:
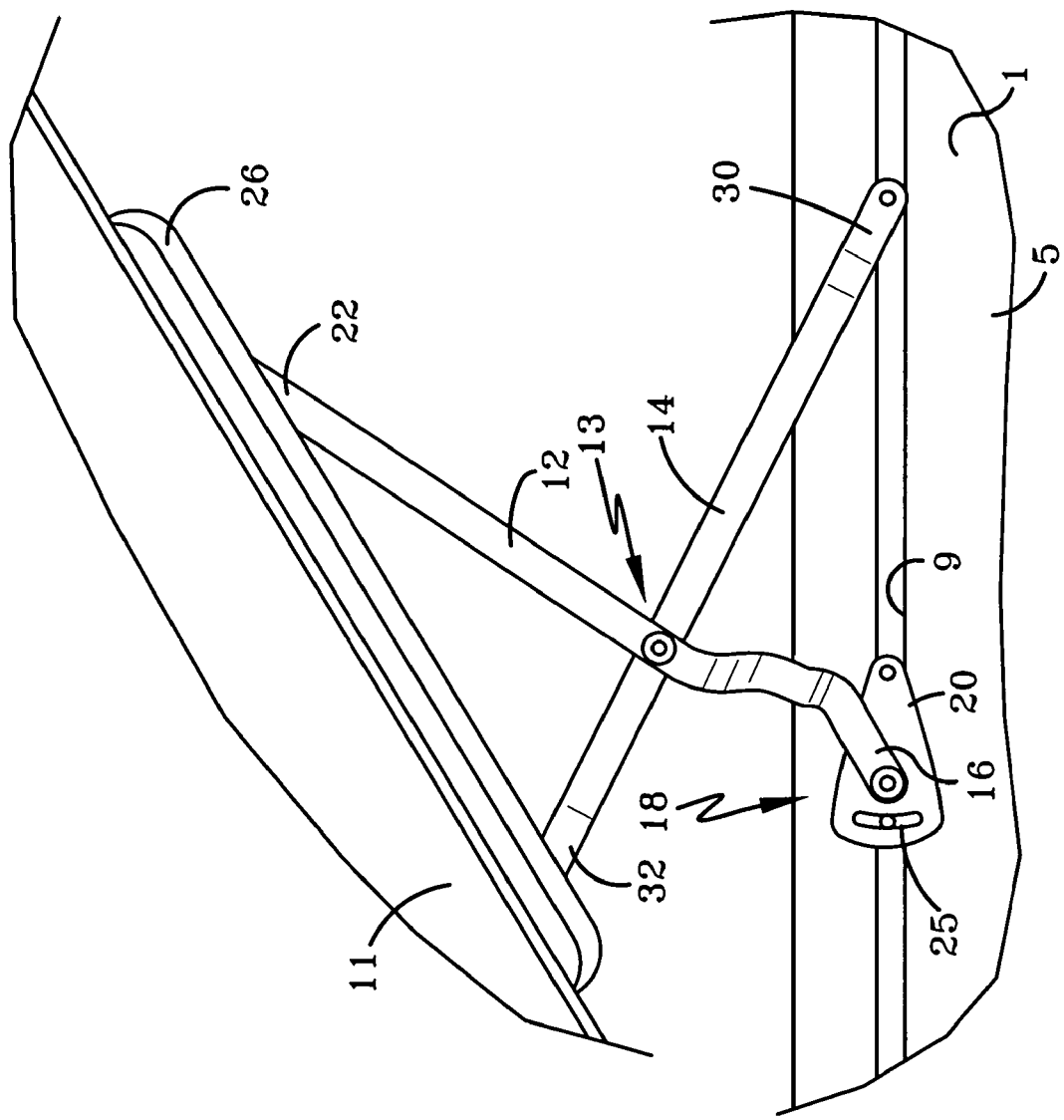
FIG. 3 is a side exploded view showing how the hinge system may be attached to the vehicle and the cover member.
Figure 4:
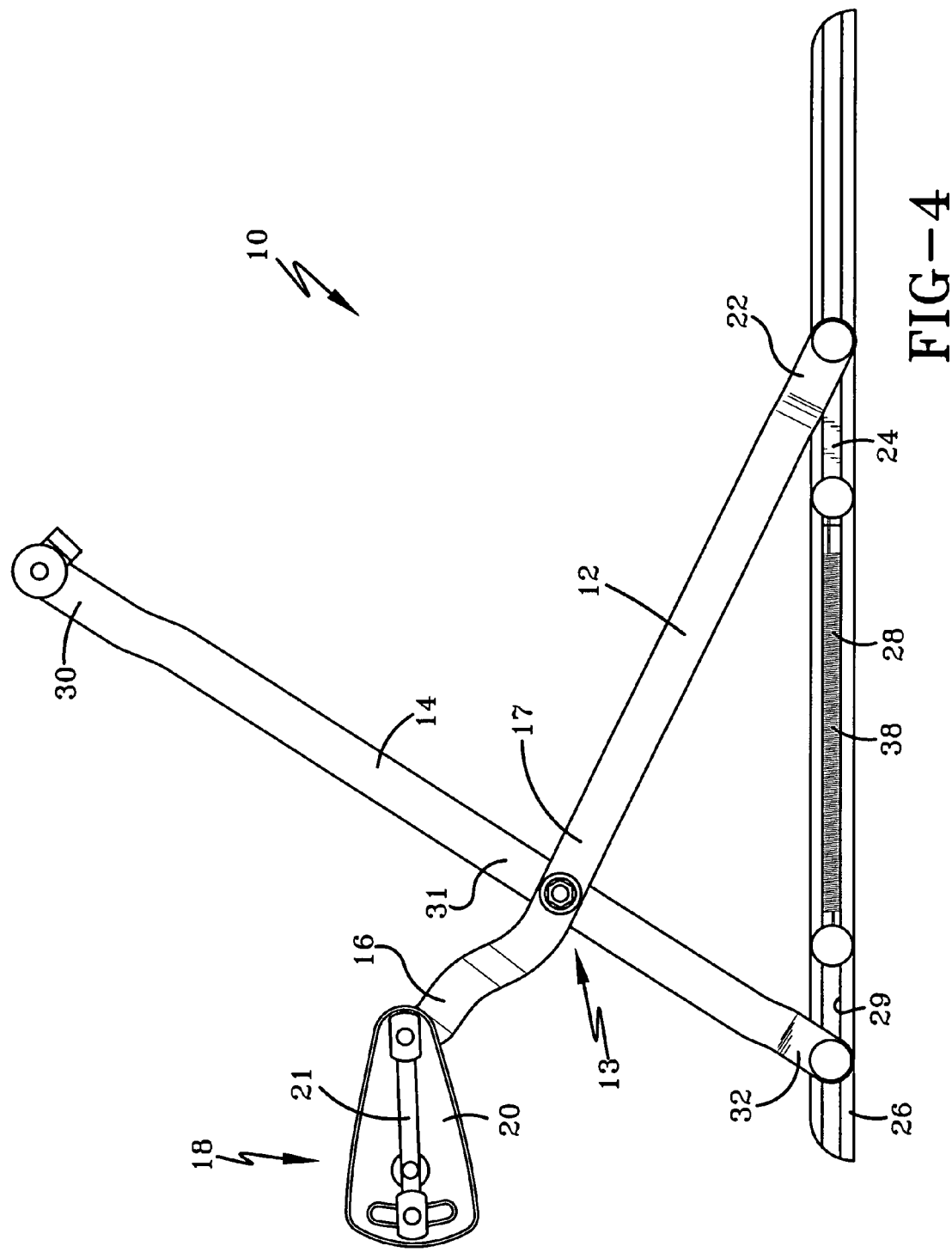
FIG. 4 is a first side view of the hinge system shown in the open position.
Figure 5:
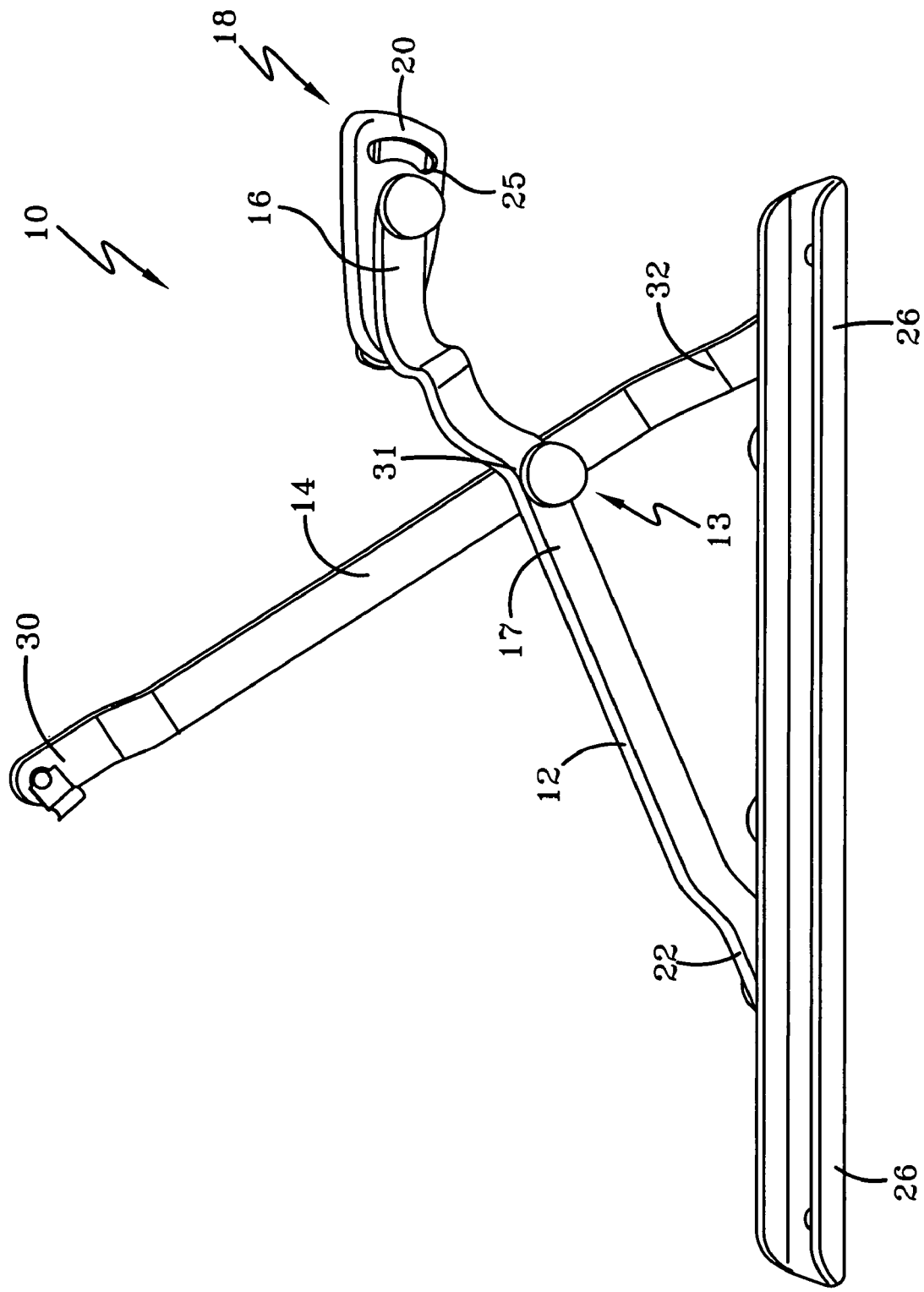
FIG. 5 is a second side view of the hinge system shown in the open position.
Figure 6:
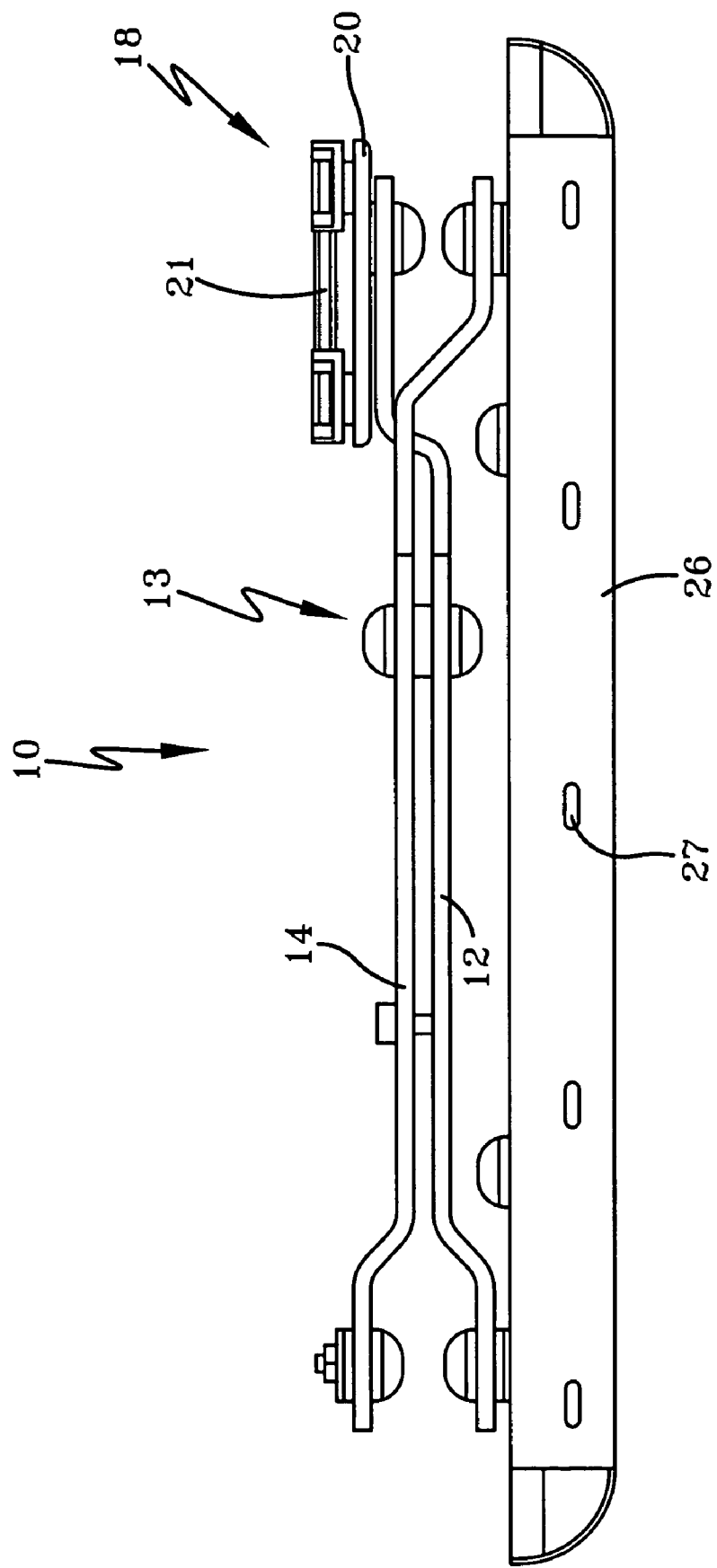
FIG. 6 is a top view of the hinge system shown in a closed position.
Figure 7:
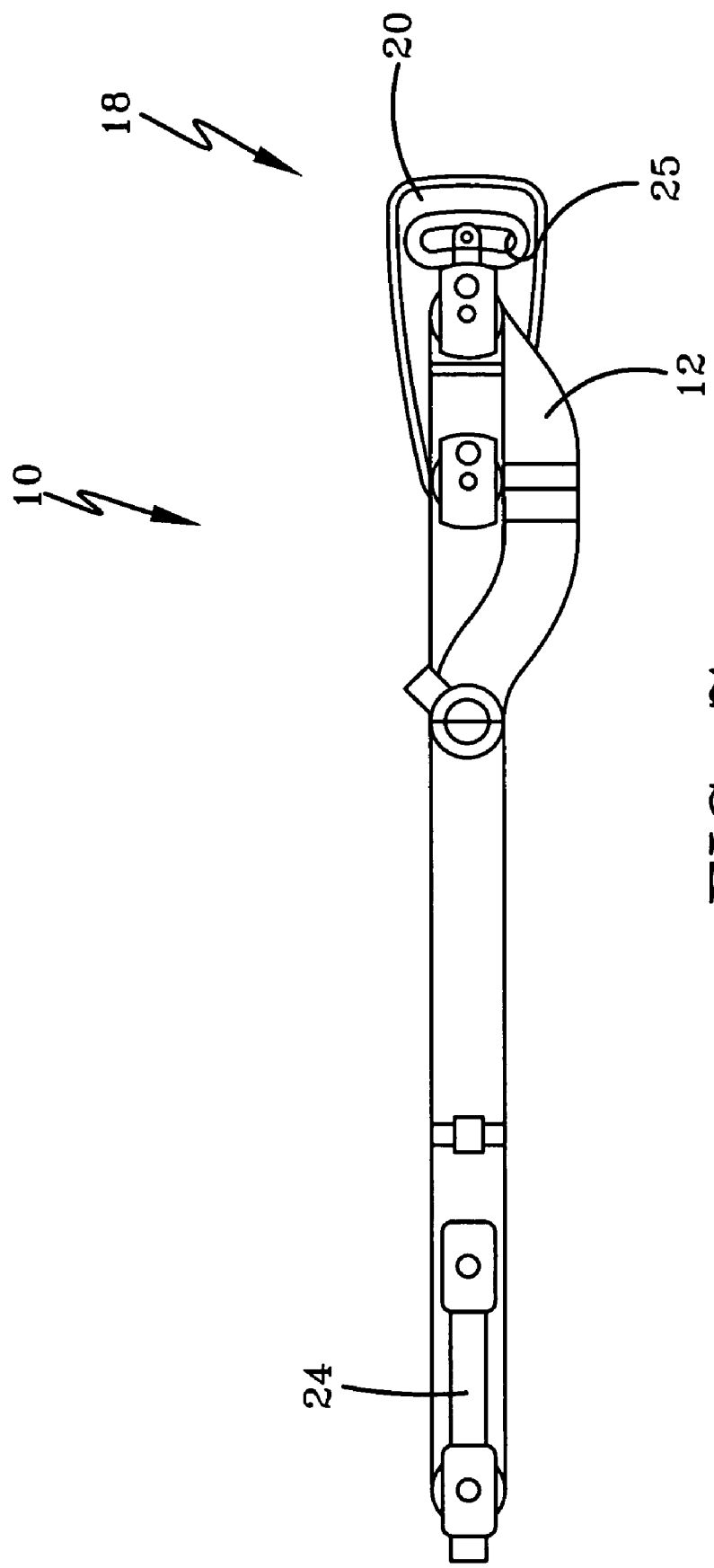
FIG. 7 is a front view of the hinge system shown in FIG. 6 with certain parts removed for clarity.
Figure 8:
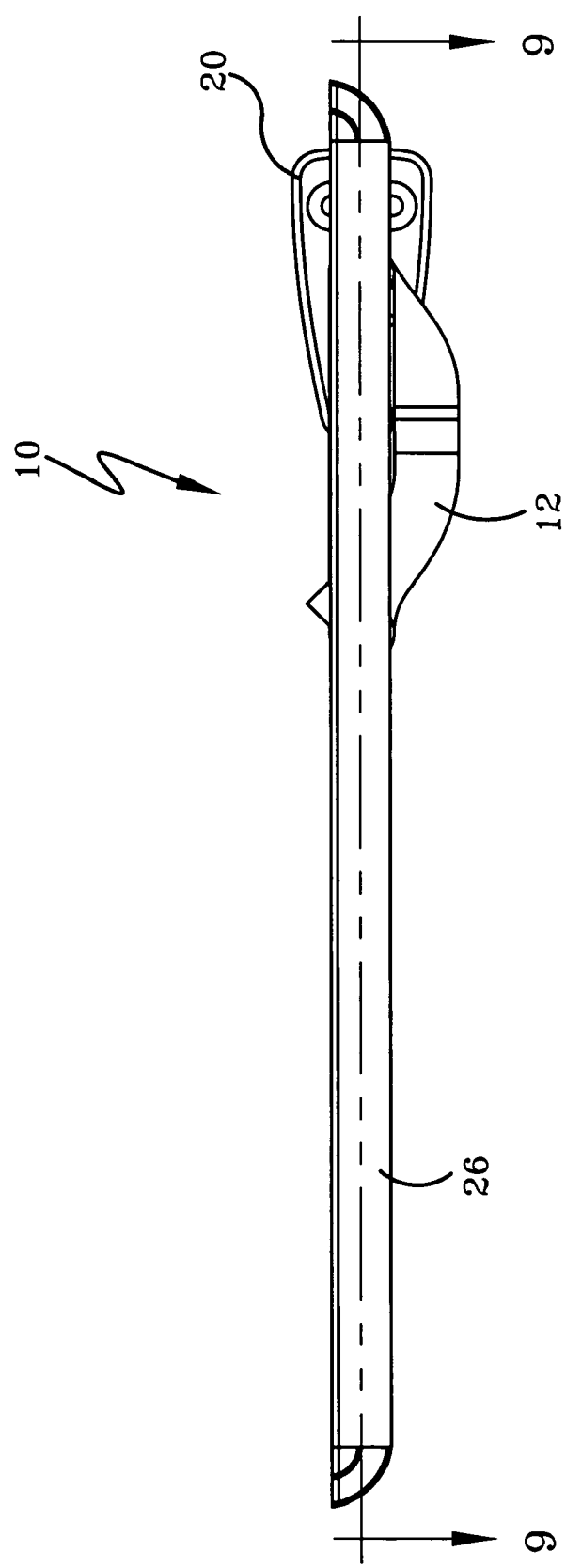
FIG. 8 is a front view of the hinge system shown in FIG. 6.
Figure 9:
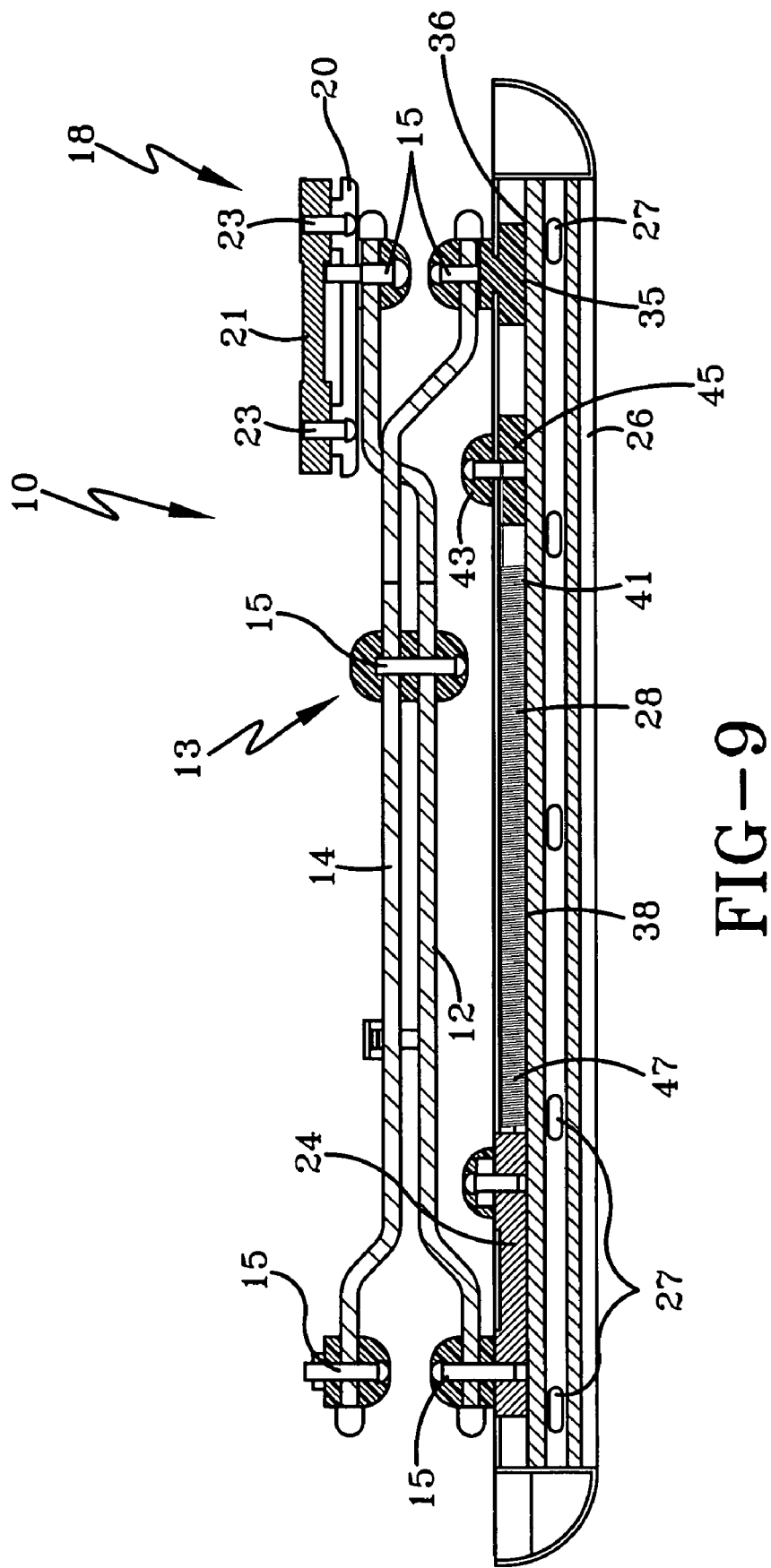
FIG. 9 is a sectional top view taken along the line 9-9 from FIG. 8.
Figure 10:
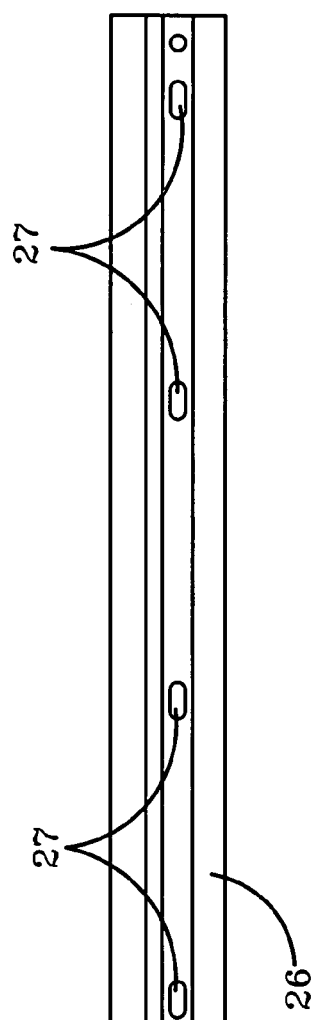
FIG. 10 is a top view of the mounting rail.
Figure 11:
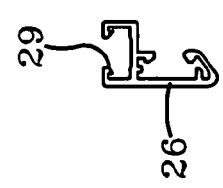
FIG. 11 is an end view of the mounting rail of FIG. 10.

Referring now to the drawings wherein the showings are for purposes of illustrating one or more embodiments of the invention only and not for purposes of limiting the same, FIGS. 1 and 2 show a vehicle 1 equipped with a hinge system 10 according to this invention that is used to adjust a cover member 11, such as the illustrated tonneau cover. The vehicle 1 has a frame 2, a cab 3 defining an operator compartment and a plurality of ground engaging wheels 4. An engine and drive train (not shown) provide power to the wheels 4 in order to provide locomotion for the vehicle 1. A pair of walls 5, 5 extend generally upward from the frame 2. The walls 5, 5, the back wall of the cab 3, and a tailgate 6 define a bed or box 7 into which cargo can be stored. All these components, as well as others shown in FIGS. 1 and 2, are well known in the art and thus will not be described in detail here. It should be noted that while the bed 7 shown is fixed to a pick-up truck, this invention will work with beds defined on other vehicles and on other beds or similar areas that are enclosed by a cover member not mounted on vehicles. It should also be noted that while the cover member 11 shown also uses a pair of pivotable support arms 8 to assist in supporting the weight of the cover member 11, these support arms 8 are not part of this invention and may not be required in some applications, depending on the size and weight of the cover member.

With continuing reference to FIGS. 1 and 2, the hinge system 10 is used to adjust the cover member 11 between a closed position (shown in FIG. 1) where the cover member 11 covers the bed 7 and an open position (shown in FIG. 2) where the cover member 11 does not cover the vehicle bed 7. When the bed 7 is uncovered it can be easily accessed to, for example, load and unload cargo. In the embodiment shown, two hinge systems 10 are used. However, the hinge systems 10 are mirror images of one another, thus, only one hinge system 10 will be described in detail. The hinge system 10 may include a first arm 12, a second arm 14 and a mounting rail 26.

With reference now to FIGS. 3-9, the first arm 12 may be an elongate bar having first and second ends 16, 22 and a midsection 17. The second arm 14 also may be an elongate bar having first and second ends 30, 32 and a midsection 31. Each midsection 17, 31 may have an aperture to form a pivotal connection 13 between the first arm 12 and the second arm 14. The first and second arms 12, 14 thus define a scissor style hinge. The first ends 16, 30 are adapted to be connected to the vehicle 1 and the second ends 22, 32 are adapted to be connected to the cover member 11. Preferably, one of the first ends 16 or 30 is slidingly connected to the vehicle 1 and the other of the first ends 30 or 16 is pivotally connected to the vehicle 1. In the embodiment shown, the first end 30 of the second arm 14 is pivotally connected to an inside upper portion of vehicle wall 5 and the second end 32 of the second arm 14 is pivotally connected to the mounting rail 26. The pivotal connection 13 as well as the pivotal connections at the first and second ends 30, 32 of the second arm 14 can be formed in any conventional manner but in the embodiments shown are formed using a bolt shoulder member 15. The hinge system 10 eliminates steel-on-steel contact by utilizing the bolt shoulder members 15 and bushing washers shown in the drawings. This militates against corrosion. Additionally, the bolt shoulder members 15 and bushing washers allow for "hinge flex" to occur. This accounts for fiberglass unevenness and model-to-model application variation characteristics. Otherwise, the hinge system 10 may be prone to binding or undesirable torsional forces applied to the pivot point and slide-bar components, thereby causing premature wear.

With continuing reference to FIGS. 3-9, the first end 16 of the first arm 12 is both pivotally and slidingly connected to the vehicle 1 and the second end 22 of the first arm 12 is both pivotally and slidingly connected to the mounting rail 26. These pivotal connections may, as shown, also be formed using the previously mentioned bolt shoulder members 15. The first end 16 may be slidingly connected to the vehicle 1 with the use of a slide bar assembly 18. As shown, the slide bar assembly 18 includes a slide bar 21 and a bracket 20. The bracket 20 may be positioned between the slide bar 21 and first end 16 of the first arm 12 and attached together by at least one bolt 23, two such bolts shown. In one embodiment, shown, the bracket 20 has at least one groove 25 that receives the bolt 23. In this way, the position of the slide bar 21 with respect to the bracket 20 can be adjusted to facilitate alignment of the cover member 11 with respect to the vehicle 1. The slide bar 21, and thus the slide bar assembly 18, is adapted to be slidingly received within a channel 9 defined in an inside upper portion of the vehicle wall 5. Any potential misalignment of the cover member 11 with respect to the walls 5 of the vehicle 1 can be compensated for and corrected by adjusting the bracket 20 along the groove 25 as desired.

With reference now to FIGS. 4-11, the mounting rail 26 may include one or more openings 27 for use in receiving fastening screws to attach the mounting rail 26 to the underside of the cover member 11. The mounting rail 26 may also have a channel 29. The second end 32 of the second arm 14 may be pivotally connected to an arm bracket 35 that is received within the channel 29. The arm bracket 35 may be position adjustable within the channel 29 and a set screw 36 may be used to fix the position of the arm bracket 35 within the channel 29. This provides additional adjustment to facilitate alignment of the cover member 11 with respect to the vehicle 1. The second end 22 of the first arm 12 is adapted to be pivotally connected to a slide bar 24 that is slidingly disposed in the mounting rail channel 29.

With continuing reference to FIGS. 4-11, a biasing device 38 may be provided to bias the cover member 11 toward the open position whenever the cover member 11 is not in the closed position. The biasing device 38 preferably does not bias the cover member 11 toward the open position when the cover member 11 is in the closed position. In one embodiment, the biasing device 38 is a spring 28 disposed with the mounting rail channel 29. By positioning the spring 28 within the channel 29, the spring 28 exerts a linear force in operation. Thus, a smooth "gliding action" results which militates against undue stress on the pivotal connection 13 and other components when the cover member is in the closed position. The spring 28 is preferably a tension spring. A first end 41 of the spring 28 may be connected to a spring bracket 43 that is received within the channel 29, as shown. The spring bracket 43 may be position adjustable within the channel 29 and a set screw 45 may be used to fix the position of the spring bracket 43 within the channel 29. This provides adjustment of the spring rate of the spring 28 to facilitate adjustment of the force necessary to move the cover member 11 with respect to the vehicle 1. A second end 47 of the spring 28 may be connected to the slide bar 24. In this way the biasing device 38 generally urges the second end 22 of the first arm 12 toward the first end 30 of the second arm 14 and thus generally biases the cover member 11 toward the open position. It should be noted, however, that when the cover member 11 is in the closed position, the midsection 17 of the first arm 12, the midsection 31 of the second arm 14, and the biasing device 38 are substantially parallel. This is shown in FIGS. 6-9. With this alignment, the biasing device 38 does not bias the second end 22 of the first arm 12 and thus does not bias the cover member 11. As a result, even though the spring 28 is in its fully expanded condition, virtually no force is required to maintain the cover member 11 in the closed position.

With reference now to FIGS. 1-11, the operation of the hinge system 10 will now be described. When it is desired to open the cover member 11, a lifting force is applied at an end opposite where the hinge system 10 is connected. As the cover member 11 is lifted, the first end 16 of the first arm 12 slides within the channel 9 formed in the vehicle wall 5 and the second end 22 of the first arm 12 slides within the channel 29 formed in the mounting rail 26. The biasing device 38 cooperates with the lifting force through the first arm 12 to urge the cover member 11 towards the open position. Thus, the lifting force required to open the cover member 11 is minimized by the biasing device 38. To close the cover member 11, a downward force is applied to the end opposite where the hinge system 10 is connected. The force of the biasing device 38 urges the cover member 11 through the first arm 12 in a direction opposite the downward force, thereby militating against the cover member 11 slamming down to the closed position.

When the cover member 11 is opened, the portion adjacent the hinge system 10 lifts straight up initially, then continues upwards while moving towards the rear of the vehicle 1 or towards the end of the cover member 11 opposite the hinge system 10. Total lift of the portion of the cover member 11 adjacent the hinge system 10 for the embodiment shown is approximately 2.0 inches. The total rearward movement is approximately 3.0 inches. The total lift of the end opposite the hinge system 10 is approximately 27.5 inches. Thus, the entire cover member 11 is lifted off the bed 7 of the vehicle 1. These distances are exemplary and not intended to limit the scope of the invention in any way.

From the foregoing description, one ordinarily skilled in the art can easily ascertain the essential characteristics of this invention and, without departing from the spirit and scope thereof, can make various changes and modifications to the invention to adapt it to various usages and conditions.

We claim:

1. A hinge system for use in adjusting a cover member between a closed position where the cover member covers at least a portion of a vehicle bed and an open position where the cover member does not cover the vehicle bed, the hinge system comprising:
    a first arm having first and second ends and a midsection, the first end adapted to be connected to the vehicle and the second end adapted to be connected to the cover member;
    a second arm having first and second ends and a midsection, the first end adapted to be connected to the vehicle and the second end adapted to be connected to the cover member, the midsection of the first arm being pivotally connected to the midsection of the second arm; and,
    a biasing device, operatively connected to either the first arm or the second arms, that biases the cover member toward the open position whenever the cover member is not in the closed position and that does not bias the cover member toward the open position whenever the cover member is in the closed position.

2. The hinge system of claim 1 wherein the midsection of the first arm, the midsection of the second arm, and the biasing device are substantially parallel when the cover member is in the closed position.

3. The hinge system of claim 2 wherein the biasing device is a tension spring.

4. The hinge system of claim 2 wherein the first end of the first arm is slidingly connected to the vehicle.

5. The hinge system of claim 4 further comprising:
    a slide bar assembly operatively connected to the first end of the first arm, the slide bar assembly comprising: (a) a slide bar that is slideable within a channel defined in a vehicle wall; and, (b) a bracket positioned between the slide bar and the first end of the first arm.

6. The hinge system of claim 5 wherein the bracket has a groove that permits the slide bar to be position adjusted with respect to the bracket.

7. A hinge system comprising:
    a first arm having first and second ends and a midsection, the first end adapted to be connected to an associated vehicle;
    a second arm having first and second ends and a midsection, the first end adapted to be connected to the vehicle, the midsection of the first arm being pivotally connected to the midsection of the second arm; and,
    a mounting rail adapted to be connected to a cover member used to cover an associated vehicle's bed, the mounting rail having a channel that slidingly receives one of the second ends of the first and second arms and that pivotally receives the other of the second ends of the first and second arms.

8. The hinge system of claim 7 wherein one of the first ends of the first and second arms is adapted to be slidingly connected to the vehicle and the other of the first ends of the first and second arms is adapted to be pivotally connected to the vehicle.

9. The hinge system of claim 8 further comprising:
    a biasing device positioned within the channel.

10. The hinge system of claim 9 wherein the first end of the first arm is slidingly connected to the vehicle and the second end of the first arm is slidingly connected to the mounting rail.

11. The hinge system of claim 10 wherein the biasing device is a tension spring.

12. The hinge system of claim 10 wherein the first end of the second arm is pivotally connected to an arm bracket that is received within the mounting rail channel.

13. The hinge system of claim 12 wherein the arm bracket is position adjustable within the channel.

14. The hinge system of claim 9 wherein the biasing device has a first end connected to a spring bracket that is received within the channel and a second end connected to a slide bar that is received within the channel.

15. A method comprising the steps of:
    providing a vehicle having a vehicle bed;
    providing a cover member;
    providing a hinge system for use in adjusting the cover member with respect to the vehicle bed, the hinge comprising a biasing device;
    positioning the cover member into a closed position where the cover member covers at least a portion of the vehicle bed and the biasing device does not bias the cover member;
    beginning to adjust the cover member toward an open position thereby placing the biasing device into a condition where it biases the cover member toward the open position; and,
    adjusting the cover member into the open position.

16. The method of claim 15 further comprising the steps of:
    beginning to adjust the cover member toward the closed position thereby overcoming the biasing force of the biasing device; and,
    positioning the cover member into the closed position thereby returning the biasing device to the condition where it does not bias the cover member.

17. The method of claim 16 wherein:
    the step of providing a hinge system for use in adjusting the cover member with respect to the vehicle bed, the hinge comprising a biasing device, comprises the steps of: (1) providing a first arm having first and second ends and a midsection; (2) providing a second arm having first and second ends and a midsection; (3) pivotally connecting the midsection of the first arm to the midsection of the second arm; (4) attaching the first end of the first arm to the vehicle; (5) attaching the first end of the second arm to the vehicle; and, (6) positioning the biasing device between the second end of the first arm and the second end of the second arm; and, the step of positioning the cover member into a closed position where the cover member covers at least a portion of the vehicle bed and the biasing device does not bias the cover member, comprises the step of: positioning the midsection of the first arm, the midsection of the second arm, and the biasing device into substantially parallel alignment.

18. The method of claim 17 wherein:

the step of providing a hinge system for use in adjusting the cover member with respect to the vehicle bed, the hinge comprising a biasing device, further comprises the steps of: providing a mounting rail having a channel; and, connecting the mounting rail to the cover member;

the step of beginning to adjust the cover member toward an open position thereby placing the biasing device into a condition where it biases the cover member toward the open position, comprises the steps of: sliding one of the second ends of the first and second arms along the channel; and, pivoting the other of the second ends of the first and second arms about the mounting rail.

* * * * *

UNITED STATES PATENT AND TRADEMARK OFFICE
CERTIFICATE OF CORRECTION

PATENT NO. : 7,264,297 B2  Page 1 of 1
APPLICATION NO. : 11/199336
DATED : September 4, 2007
INVENTOR(S) : Robert Boulard et al.

It is certified that error appears in the above-identified patent and that said Letters Patent is hereby corrected as shown below:

Claim 1, Col. 5, Line 40:
"second arms" should be --second arm--

Signed and Sealed this

Twenty-seventh Day of November, 2007

JON W. DUDAS
*Director of the United States Patent and Trademark Office*